United States Patent
Ward

(10) Patent No.: US 6,931,691 B1
(45) Date of Patent: Aug. 23, 2005

(54) WIPER SPRING

(75) Inventor: Richard E. Ward, Chagrin Falls, OH (US)

(73) Assignee: DER 3 Products, Chagrin Falls, OH (US)

( * ) Notice: Subject to any disclaimer, the term of this patent is extended or adjusted under 35 U.S.C. 154(b) by 90 days.

(21) Appl. No.: 10/621,820

(22) Filed: Jul. 17, 2003

(51) Int. Cl.$^7$ .............................. B60S 1/32; B60S 1/34
(52) U.S. Cl. .................... 15/250.351; 15/250.202; 267/154; 267/155
(58) Field of Search ................. 15/250.351, 250.352, 15/250.202, 250.19, 257.01; 267/155, 154, 267/166, 273, 275, 279

(56) References Cited

U.S. PATENT DOCUMENTS

| | | | |
|---|---|---|---|
| RE19,113 E * | 3/1934 | Oishei et al. ............ | 15/250.34 |
| 2,602,950 A * | 7/1952 | Sacchin .................. | 15/250.202 |
| 2,660,748 A * | 12/1953 | Gaumer ................... | 15/257.01 |
| 2,885,710 A * | 5/1959 | Brasty .................... | 15/257.01 |
| 4,750,235 A * | 6/1988 | Scorsiroli ............. | 15/250.352 |
| 5,008,971 A * | 4/1991 | Stewart, Sr. ........... | 15/250.202 |
| 5,320,333 A * | 6/1994 | Koch ...................... | 267/155 |
| 6,804,855 B2 * | 10/2004 | Lebel .................... | 15/250.202 |

* cited by examiner

Primary Examiner—Gary K. Graham
(74) Attorney, Agent, or Firm—Renner, Otto, Boisselle & Sklar, LLP

(57) ABSTRACT

Wiper spring is made of a length of spring wire having hook-like end portions at opposite ends. One of the end portions is shaped to slide over the drive arm of a vehicle wiper assembly from one side. The other end portion is shaped to hook over the wiper arm of the vehicle wiper assembly for applying additional spring force to the wiper arm to maintain better contact of the wiper blade against the surface being wiped during operation of the wiper assembly.

7 Claims, 2 Drawing Sheets

WIPER SPRING

FIELD OF THE INVENTION

This invention relates to a wiper spring for use in applying additional spring force to the wiper arm of a vehicle wiper assembly to help keep the wiper blade on the wiper arm in close contact with a surface of the vehicle to be wiped during use of the wiper assembly.

BACKGROUND OF THE INVENTION

Vehicle wiper assemblies typically include a drive arm that is mounted on a drive shaft for back and forth movement. A wiper arm is connected to the drive arm as by a spring loaded hinge connection that urges a wiper blade on the wiper arm into contact with the windshield and in some cases the rear window of certain vehicles including for example vans and SUVs.

Initially most wiper assemblies do a reasonably good job in keeping the wiped surfaces clean of rain, sleet, snow and road splatter and the like. However, after awhile, because of wiper blade wear and other factors, the wiper assemblies do not always maintain sufficient contact of the wiper blade against the surface being wiped to keep the surface as clean as desired, creating a safety concern.

There is thus a need for a vehicle aftermarket product that can easily be fitted onto most wiper assemblies to increase the spring force acting on the wiper arm to maintain better contact between the wiper blade and surface being wiped to help keep the surface clean.

SUMMARY OF THE INVENTION

The present invention relates to a wiper spring that is easily fitted onto most vehicle wiper assemblies to increase the spring force acting on the wiper arm to maintain better contact between the wiper blade and surface being wiped to help keep the surface clean.

In accordance with one aspect of the invention, the wiper spring may comprise a length of spring wire having hook-like end portions at opposite ends, one for hooking sideways onto the wiper drive arm, and the other for hooking over the wiper arm for applying additional spring force to the wiper arm urging the wiper blade into better contact with the surface being wiped.

In accordance with another aspect of the invention, the hook-like end portions may be generally U-shape, each having a closed end, an open end opposite the closed end, and opposite sides.

In accordance with another aspect of the invention, the U-shape end portions may be shaped to permit the open end of one of the U-shape end portions to be easily slipped onto the drive arm from one side and the other U-shape end portion to be easily hooked over the wiper arm.

In accordance with another aspect of the invention, at least one spring loop may be provided in the wire spring intermediate the ends thereof to give the spring added spring force.

In accordance with another aspect of the invention, the wiper spring may be provided with one or more bends intermediate the ends thereof to give the spring added rigidity and to establish a desired preload in the spring when the spring is fitted to the wiper assembly.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail an illustrative embodiment of the invention, this being indicative, however, of but one of the various ways in which the principles of the invention may be employed.

DETAILED DESCRIPTION OF THE INVENTION

Figure 1:
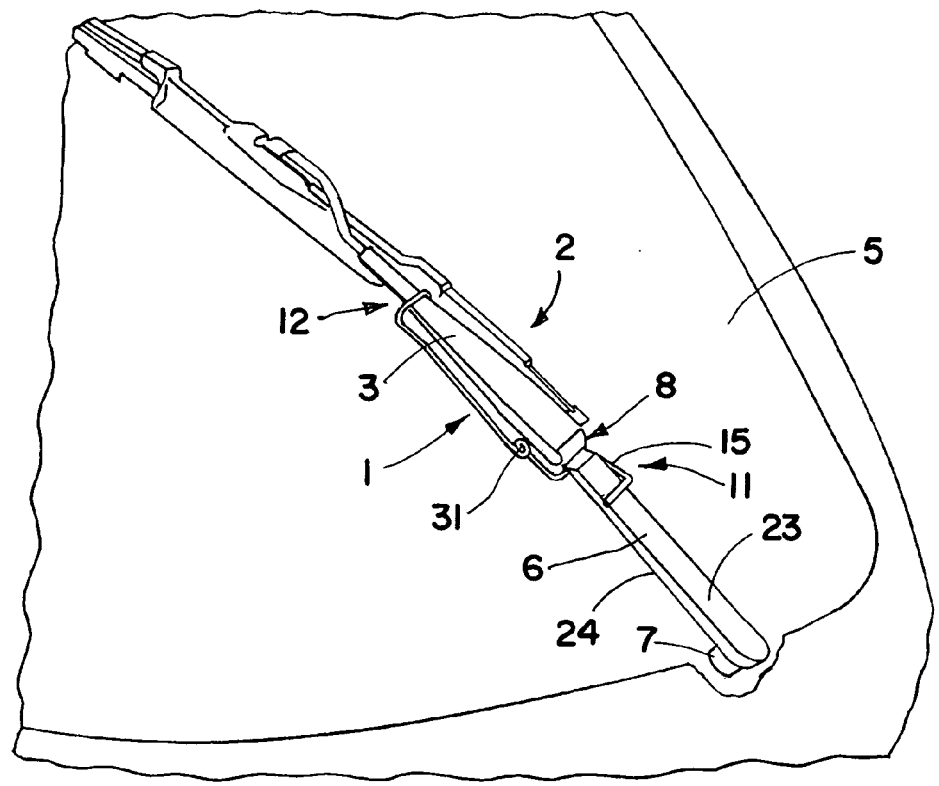
FIG. 1 is a fragmentary perspective view of a portion of a vehicle showing the wiper spring of the present invention fitted to a vehicle wiper assembly.
Figure 2:
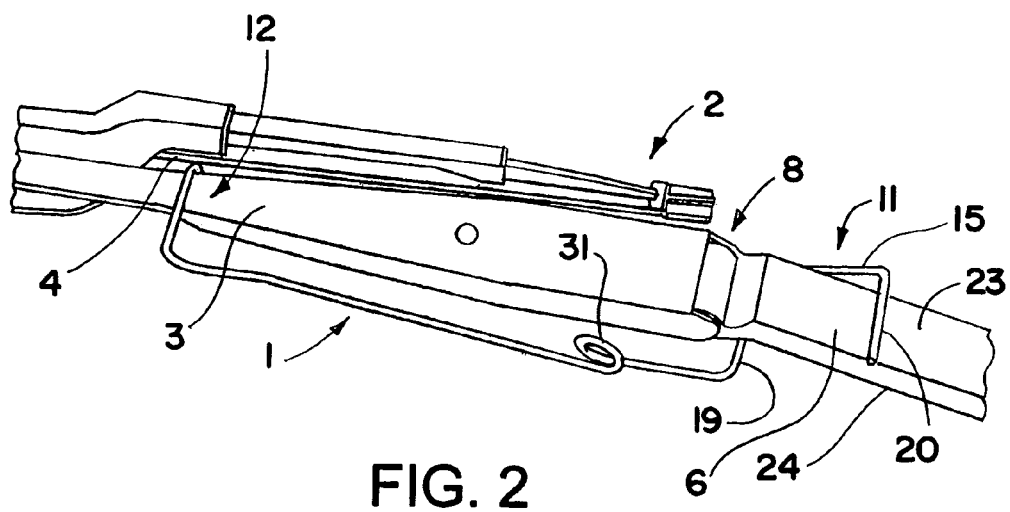
FIG. 2 is an enlarged fragmentary perspective view of the wiper assembly of FIG. 1 showing the wiper spring fitted thereto.

Referring now in detail to the drawings, and initially to FIGS. 1 and 2, there is shown one form of wiper spring 1 in accordance with the invention attached to a conventional vehicle wiper assembly 2 for applying additional spring force to the wiper arm 3 to help maintain the wiper blade 4 in contact with the windshield or other surface 5 of a vehicle to be wiped during use of the wiper assembly, including for example the rear window of certain vehicles such as vans and SUVs and the like. Wiper arm 3 may be driven back and forth by a drive arm 6 mounted on a suitable drive shaft 7 (see FIG. 1).

A spring loaded hinge connection 8 between wiper arm 3 and drive arm 6 typically maintains wiper blade 4 in contact with the surface 5 being wiped, as well known in the art. The purpose of the wiper spring 1 is to increase the spring force acting on the wiper arm 3 to help maintain the wiper blade 4 in contact with the surface 5 being wiped to help keep the surface clean in all types of adverse weather conditions for better visibility through the surface during vehicle operation.

Referring now additionally to FIGS. 3–7, wiper spring 1 may be made of a suitable spring steel wire 10 of a desired diameter and length that is bent to provide hook-like end portions 11 and 12 at opposite ends thereof. Both hook-like end portions 11 and 12 may be generally U-shape, each having a closed end 15 and 16, an open end 17 and 18 opposite the closed end, and opposite sides 19, 20 and 21, 22, respectively.

Figure 4:
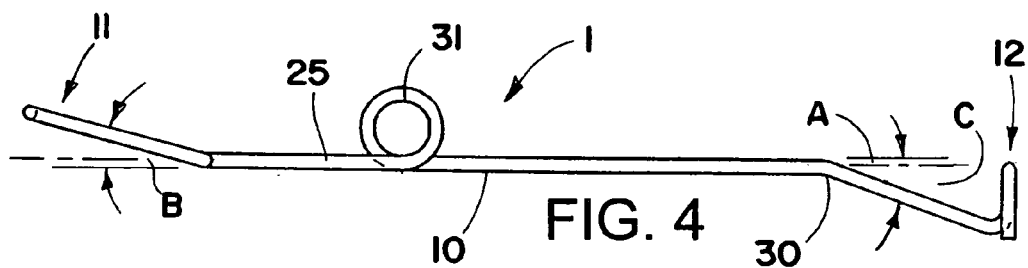
FIG. 4 is a side elevation view of the wiper spring.
Figure 5:
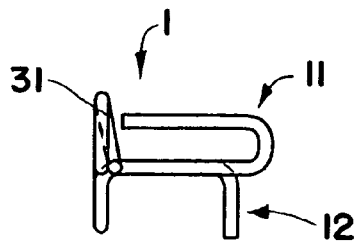
FIG. 5 is an end elevation of the wiper spring as seen from the left end of FIG. 4.
Figure 6:
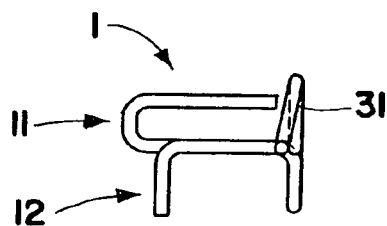
FIG. 6 is an end elevation view of the wiper spring as seen from the right end of FIG. 4.
Figure 7:
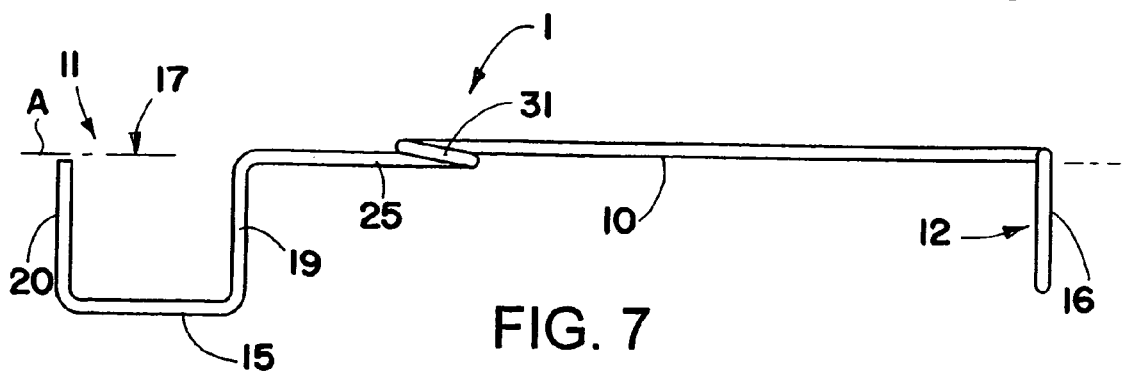
FIG. 7 is a top plan view of the wiper spring of FIG. 4.

One of the hook-like end portions 11 may be larger than the other end portion 12 for ease of slipping of the larger end portion onto the drive arm 6 from one side with opposite sides 19, 20 of the hook-like end portion 11 engaging the inwardly and outwardly facing surfaces 23 and 24 of the drive arm as described hereafter. Also, the larger hook-like end portion 11 may be on one side of the spring wire 10 with the open end 17 of the larger hook-like end portion generally facing the general axis A of an intermediate length 25 of the spring wire as shown in FIG. 7 and extending generally rearwardly of the intermediate length of spring wire at a slight upward angle B, for example, of between 10 and 20° relative to the general axis of the intermediate length as shown in FIG. 4.

The other hook-like end portion 12 may be smaller than hook-like end portion 11 for hooking over the wiper arm 3 in spaced relation from the hinge connection 8 after the larger hook-like end portion has been slipped onto the drive arm 6 from one side as described hereafter. Moreover, the smaller hook-like end portion 12 may be in a plane that is generally perpendicular to the general axis A of the intermediate length 25 of spring wire and extends generally vertically upwardly from the same side of the intermediate length of spring wire as the larger hook-like end portion 11 with the open end 18 of the smaller hook-like end portion generally facing downwardly as shown in FIGS. 3–7.

Figure 3:
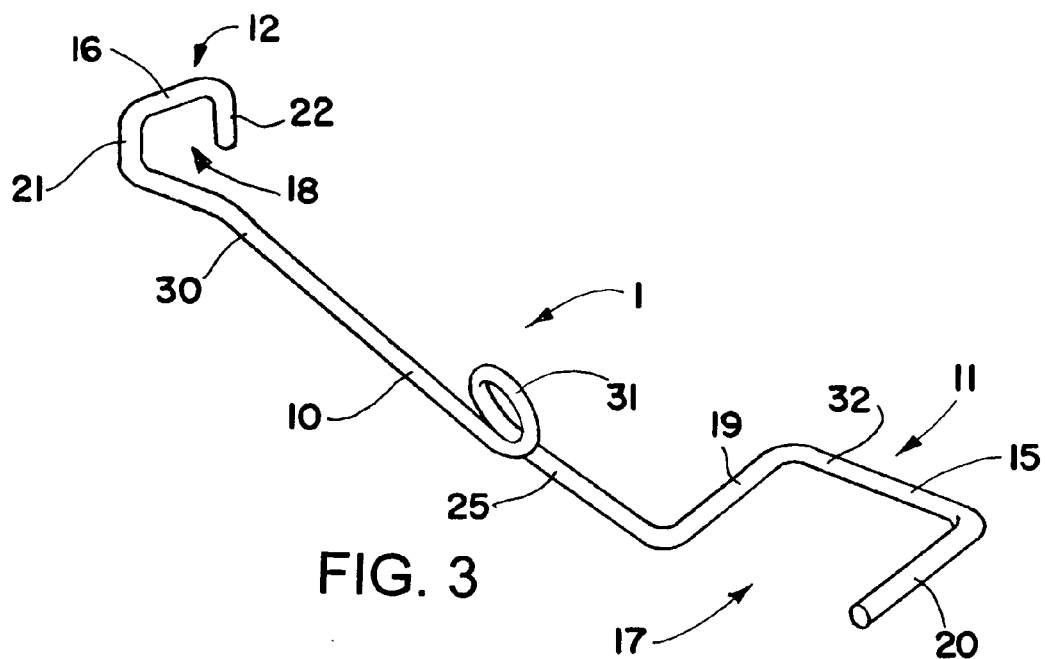
FIG. 3 is an enlarged perspective view of the wiper spring.

One or more bends 30 may be provided in the intermediate length of spring wire between the hook-like end portions 11, 12 to give the spring 1 added rigidity and to establish a desired preload in the spring when the spring is fitted to the wiper assembly. One such bend 30 is shown in the intermediate length of spring wire angled downwardly relative to the general axis of the intermediate length at a bend angle C of approximately 15° to 25° relative to the general axis of the intermediate length (see FIG. 4). Also one or more spring loops 31 may be provided in the intermediate length of spring wire (only one of which is shown) to give the spring added spring force so less expensive spring steel wire can be used to make the wiper spring. Spring loop 31 may extend generally upwardly from the intermediate length 25 of spring wire in the same general direction as the plane of the larger hook-like end portion 11, and may be located closer to the larger hook-like end portion 11 than the smaller hook-like end portion 12 as shown in FIGS. 3, 4 and 7. Also, the oppositely angled bend 30 in the intermediate length of spring wire may be located closer to the smaller hook-like end portion 12 than the larger hook-like end portion 11 as further shown in FIGS. 3, 4 and 7.

One size wiper spring 1 will generally fit most vehicle wiper assemblies. However, a longer wiper spring made of a heavier diameter wire may be required for use with wiper assemblies having longer wiper arms such as on heavier trucks, buses and possibly SUVs. Also, a suitable protective coating such as a vinyl coating 32 may be applied to the wiper spring 1 to help protect against scratching the wiper assembly and windshield or other surface to be wiped during installation of the wiper spring.

To install the wiper spring 1, the larger hook-like end portion 11 is first placed under the drive arm 6 of the wiper assembly 2 with the closed end 15 of the larger end portion pointing toward the windshield 5 and the loop 31 pointing away from the windshield as shown in FIGS. 1 and 2. Next pressure is applied to the larger hook-like end portion 11 to cause the larger end portion to slip over the drive arm 6 from one side so that the opposite sides 19, 20 of the larger hook-like end portion overlie the inwardly and outwardly facing surfaces 23, 24 of the drive arm. Then an outward and upward force is applied to the smaller hook-like end portion 12 to lift the smaller end portion above the wiper arm 3 and hook the smaller end portion over the wiper arm as further shown in FIGS. 1 and 2.

From the foregoing, it will be apparent that the wiper spring of the present invention may easily be fitted to most vehicle wiper assemblies to increase the spring force acting on the wiper arm to maintain better contact between the wiper blade and surface being wiped to help keep the surface clean.

Although the invention has been shown and described with respect to a certain embodiment, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the functions in the herein exemplary embodiments of the invention. In addition, while a particular feature of the invention may have been disclosed with respect to only one embodiment, such feature may be combined with one or more other features as may be desired or advantageous for any given or particular application.

What is claimed is:

1. A wiper spring for applying additional spring force to a wiper arm of a vehicle wiper assembly having a spring loaded hinge connection with a drive arm of the wiper assembly to assist in maintaining a wiper blade on the wiper arm in contact with a surface of the vehicle to be wiped during use of the wiper assembly, the wiper spring comprising a length of spring wire having a first hook-like end portion at one end shaped to slide over the drive arm from one side and a second hook-like end portion at an other end shaped to hook over the wiper arm, the hook-like end portions at both ends of the spring wire being generally U-shape, each including a closed end, an open end opposite the closed end, and opposite sides, the first hook-like end portion being in a plane that is generally rearwardly and upwardly angled relative to the axis of an intermediate length of the spring wire and being on one side of the intermediate length with the open end of the first hook-like end portion generally facing the axis of the intermediate length, the second hook-like end portion being in a second plane that is generally perpendicular to the axis of the intermediate length of the spring wire and extending vertically and laterally relative to the one side of the intermediate length with the open end of the second hook-like end portion generally facing downwardly, and a downwardly angled bend in the intermediate length of the spring wire adjacent the second hook-like end portion, wherein the downwardly angled bend has a bend angle of approximately 15° to 25° relative to the axis of the intermediate length of the spring wire.

2. The wiper spring of claim 1 further comprising at least one upwardly extending spring loop in the intermediate length of the spring wire intermediate the first hook-like end portion and the downwardly angled bend.

3. The wiper spring of claim 1 wherein the first hook-like end portion is in a plane that extends generally rearwardly and upwardly at an angle of approximately 10° to 20° relative to the axis of the intermediate length of the spring wire.

4. The wiper spring of claim 1 further comprising a plastic protective coating covering the length of spring wire.

5. In combination, a vehicle wiper assembly comprising a drive arm, a wiper arm, and a spring loaded hinge connection between the wiper arm and drive arm for urging the wiper arm in one direction relative to the drive arm about the hinge connection to urge a wiper blade mounted on the wiper arm toward a surface of the vehicle to be wiped upon installation of the wiper assembly on a vehicle, and a wiper spring for applying additional spring force to the wiper arm for urging the wiper arm in the same direction relative to the drive arm, the wiper spring comprising a length of spring wire having a first hook-like end portion at one end slid over the drive arm from one side and a second hook-like end portion at the other end hooked over the wiper arm, the first hook-like end portion having a generally U-shape including a closed end and an open end opposite the closed end that is slipped over the drive arm from the one side and opposite sides that respectively engage inwardly and outwardly facing surfaces of the drive arm, and the second hook-like end portion having a generally U-shape including a closed end and an open end opposite the closed end that is hooked over the wiper arm in spaced relation from the hinge connection with opposite sides of the second hook-like end portion adjacent opposite sides of the wiper arm, the first hook-like end portion being in a plane that is rearwardly and upwardly angled relative to the axis of an intermediate length of the spring wire and extending from the one side of the intermediate length with the open end of the first hook-like end portion generally facing the axis of the intermediate length of the spring wire, and the second hook-like end portion being in a second plane that is generally perpendicular to the axis of the intermediate length of the spring wire and extending vertically and laterally relative to the one side of the intermediate length with the open end of the second hook-like end portion generally facing downwardly, and a downwardly angled bend in the intermediate length of the spring wire adjacent the second hook-like end portion, wherein the downwardly angled bend has a bend angle of approximately 15° to 25° relative to the axis of the intermediate length of the spring wire.

6. The combination of claim 5 further comprising at least one upwardly extending spring loop in the intermediate length of the spring wire intermediate the first hook-like end portion and the downwardly angled bend.

7. The combination of claim 5 wherein the first hook-like end portion is in a plane that extends at an upward and rearward angle of approximately 10° to 20° relative to the axis of the intermediate length of the spring wire.

* * * * *